(12) United States Patent
Jeong

(10) Patent No.: US 6,481,656 B2
(45) Date of Patent: Nov. 19, 2002

(54) REVERSE ROTATION PREVENTING APPARATUS FOR A SPINNING REEL

(75) Inventor: Dae Hyeon Jeong, Pusan (KR)

(73) Assignee: K Y Leport Co., Ltd., Pusan (KR)

( * ) Notice: Subject to any disclaimer, the term of this patent is extended or adjusted under 35 U.S.C. 154(b) by 0 days.

(21) Appl. No.: 09/859,445

(22) Filed: May 18, 2001

(65) Prior Publication Data

US 2002/0074439 A1 Jun. 20, 2002

(30) Foreign Application Priority Data

Dec. 20, 2000 (KR) ........................................ 2000-79198

(51) Int. Cl.⁷ .............................................. A01K 89/02
(52) U.S. Cl. ........................ 242/247; 192/45; 242/298
(58) Field of Search ................................ 242/247, 295, 242/298, 299, 305, 303; 192/45

(56) References Cited

U.S. PATENT DOCUMENTS

| | | | |
|---|---|---|---|
| 4,585,188 A | * | 4/1986 | Sato et al. ................... 242/261 |
| 4,989,705 A | | 2/1991 | Kashio et al. |
| 5,370,330 A | | 12/1994 | Uehara et al. |
| 5,485,969 A | | 1/1996 | Yamaguchi |
| 5,503,343 A | | 4/1996 | Hirano et al. |
| 5,547,140 A | | 8/1996 | Kawabe et al. |
| 5,570,851 A | | 11/1996 | Yamaguchi et al. |
| 5,695,031 A | | 12/1997 | Kurita et al. |
| 5,779,015 A | | 7/1998 | Murata |
| 6,056,222 A | | 5/2000 | Hitomi |
| 6,073,870 A | | 6/2000 | Shinohara et al. |

* cited by examiner

Primary Examiner—Emmanuel M. Marcelo
(74) Attorney, Agent, or Firm—Jacobson Holman PLLC

(57) ABSTRACT

Disclosed is a reverse rotation preventing apparatus for a fishing reel, which is capable of allowing a handle of a spinning reel to be rotated in a forward direction to wind a fishing line, capable of preventing the handle from being rotated in a backward direction to unwind the fishing line, and is capable of minimizing a rotational resistance of the handle. The reverse rotation preventing apparatus includes a plurality of rollers. These rollers are inserted into an inner periphery surface of an outer race and thereafter they are fitted between an inclined surface and an outer periphery surface of a sleeve during the rotation of a handle in the backward direction. The roller supporters include a magnetic material and a nonmagnetic material. The magnetic material faces in the backward rotational direction of the fishing reel. The nonmagnetic material faces in the forward rotational direction of the fishing reel. The rollers are brought into contact with the inner periphery surface of the outer race and the outer periphery surface of the sleeve under the state that the rollers are inserted between the roller supporters. At this time, the rollers are stuck to the magnetic material and whereby the rollers are spaced from the nonmagnetic material at a predetermined distance.

1 Claim, 5 Drawing Sheets

[Fig 1]
PRIOR ART
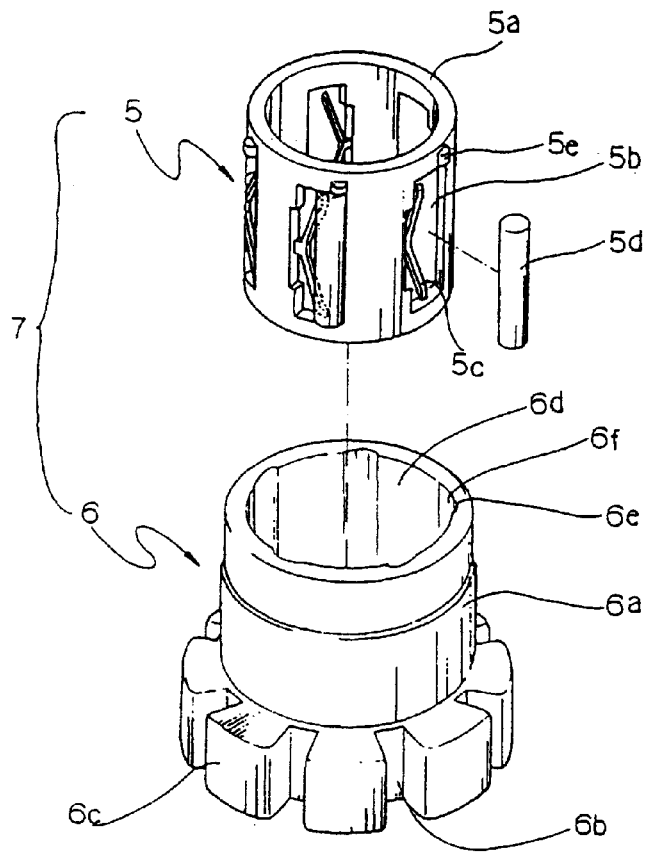
[Fig 2]
PRIOR ART
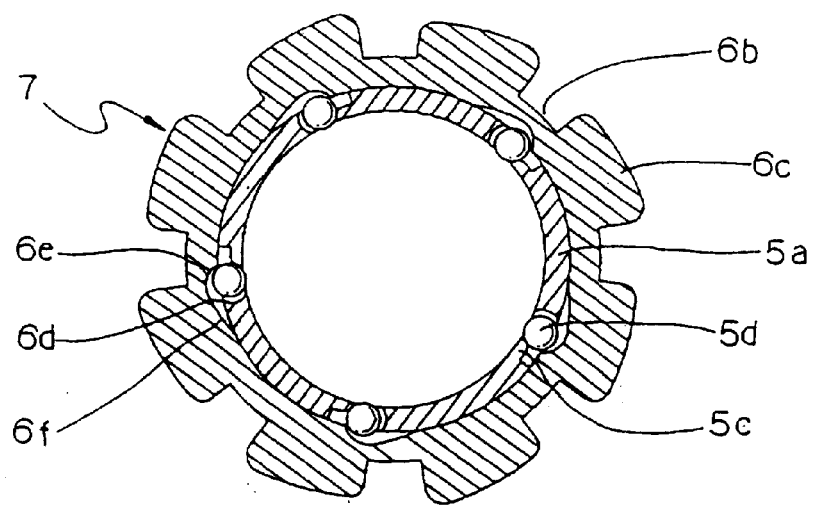

[Fig 3a]
PRIOR ART
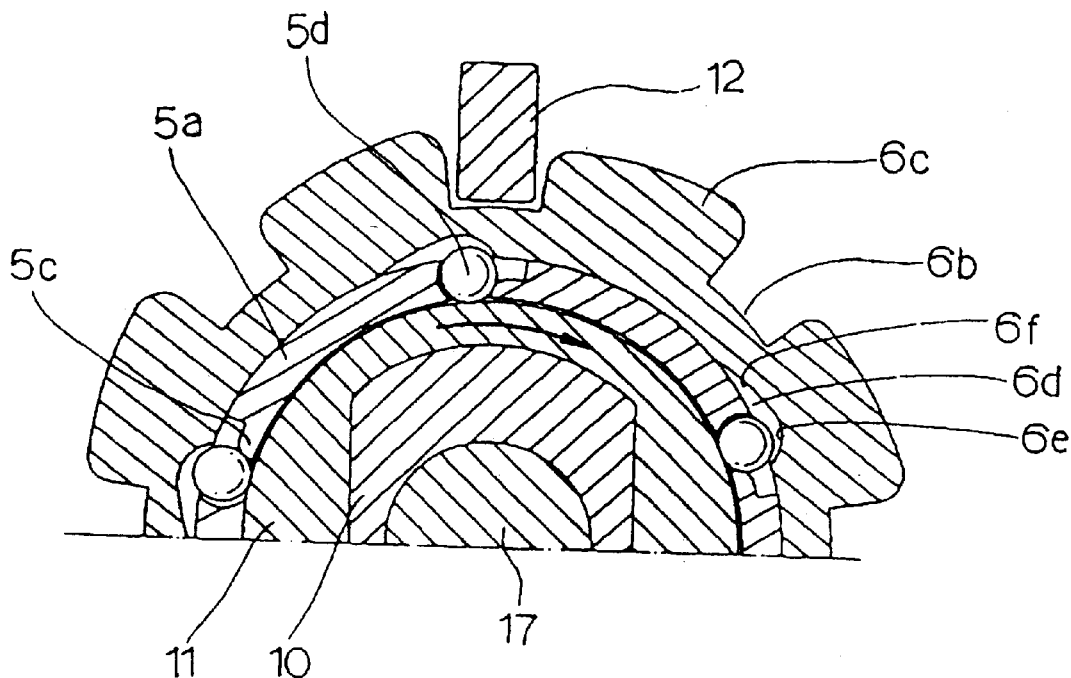
[Fig 3b]
PRIOR ART
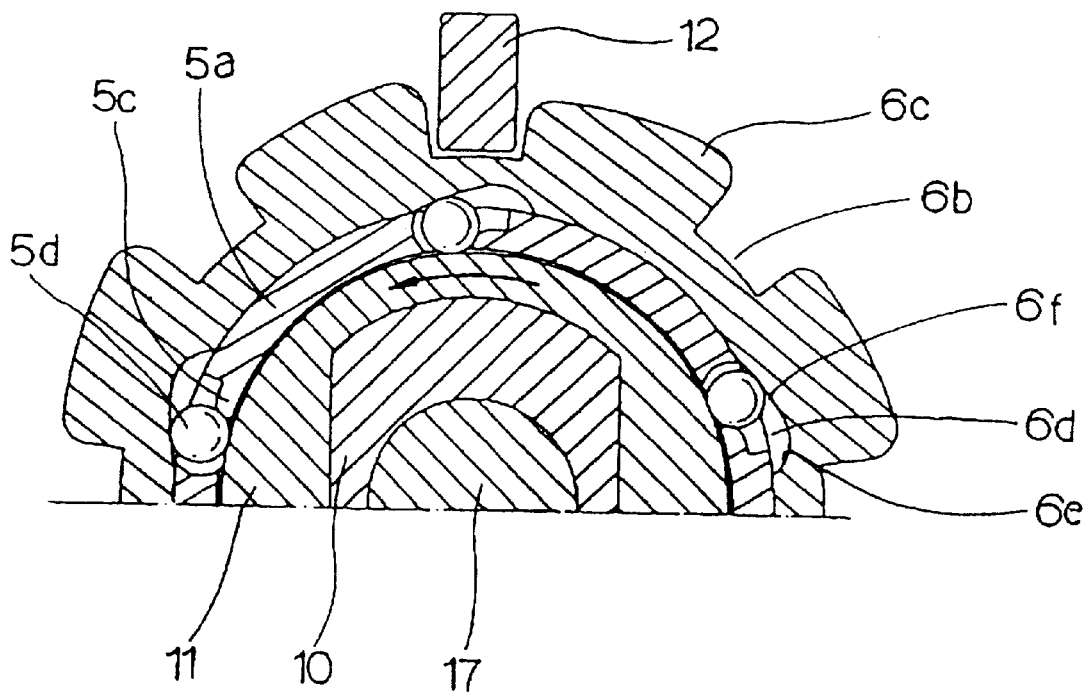

[Fig 4]
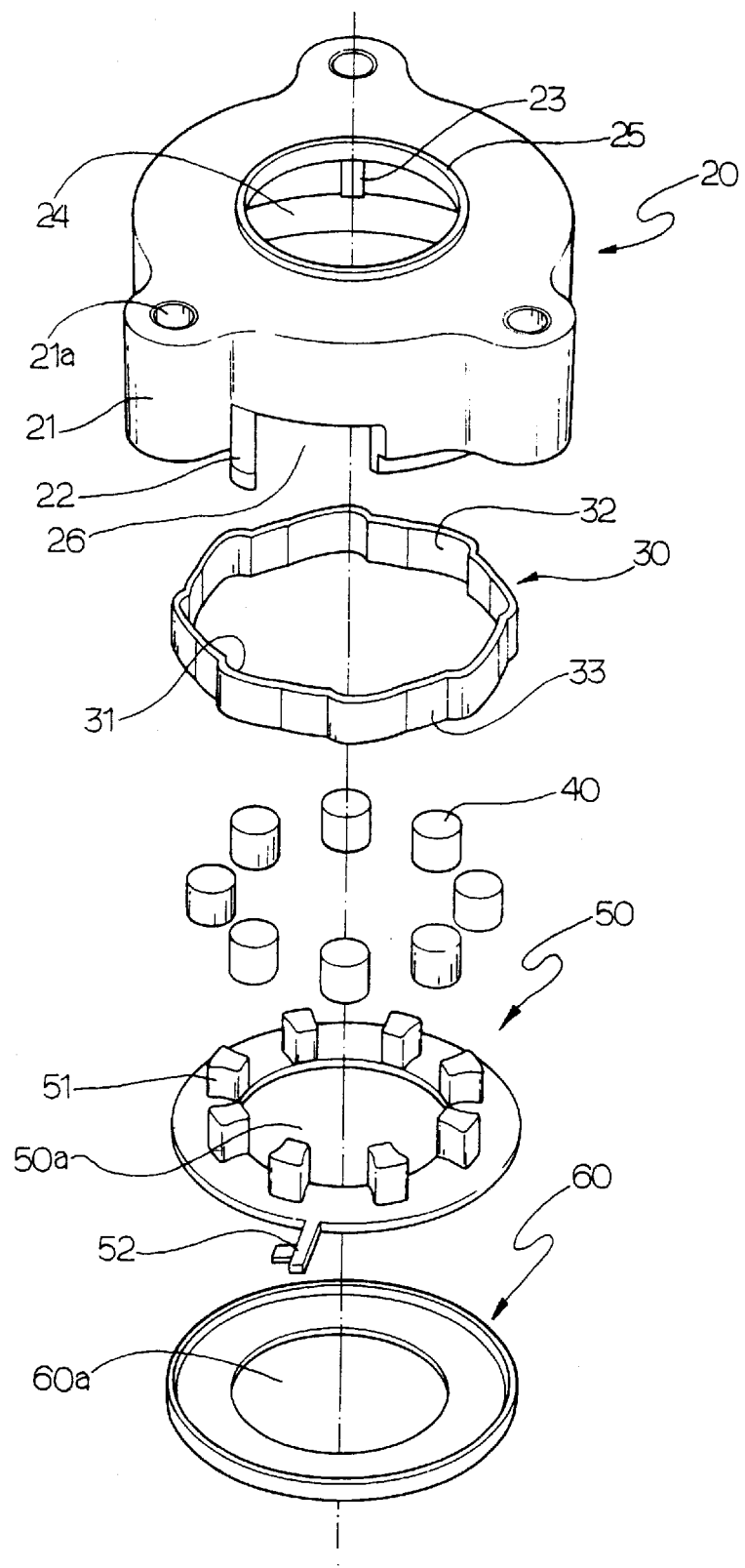

[Fig 5]
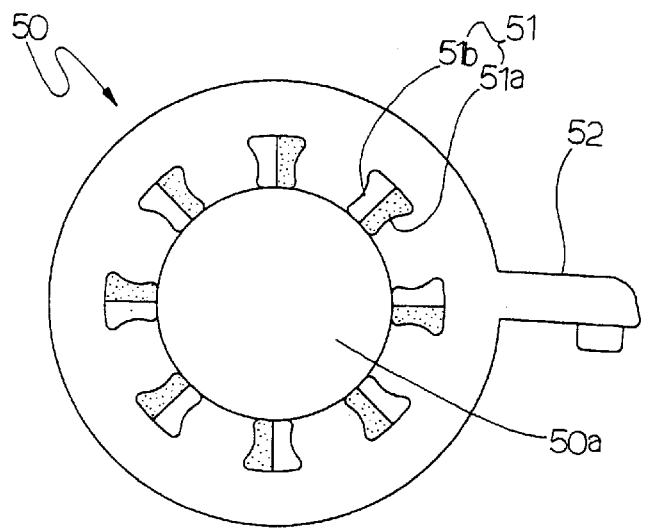
[Fig 6a]
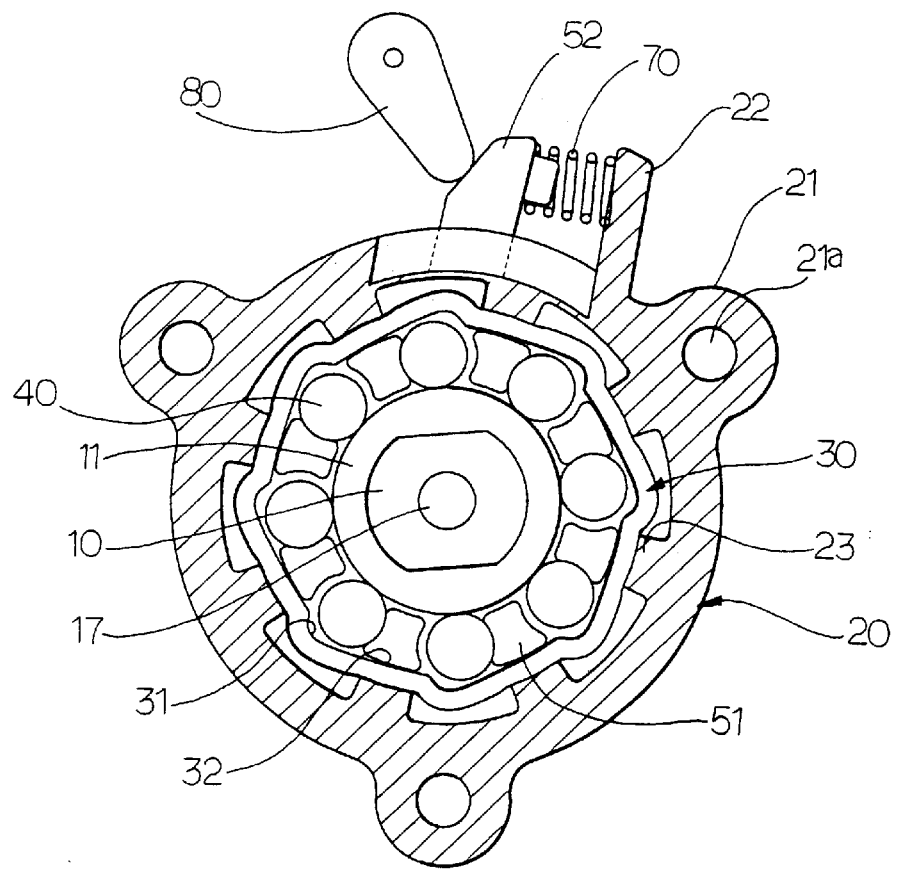

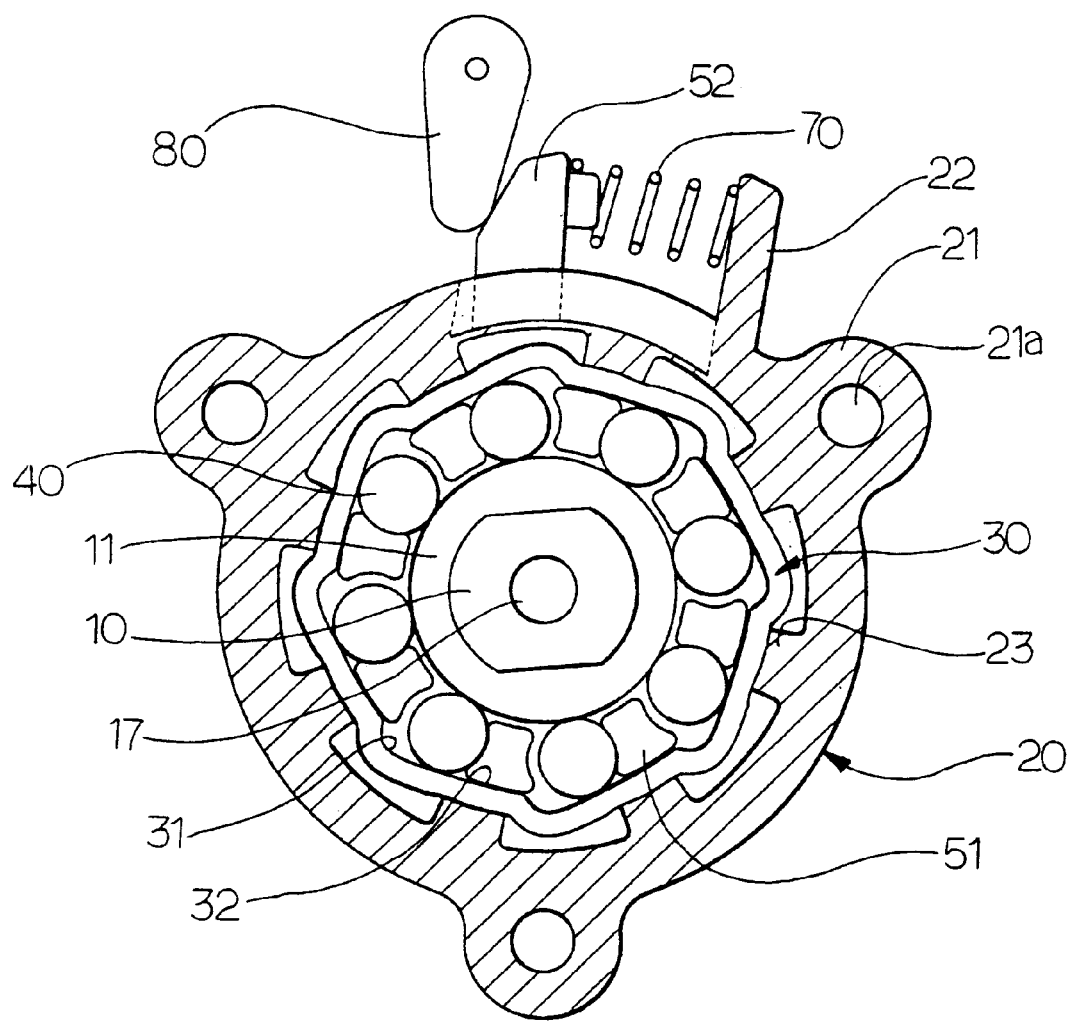
[Fig 6b]

REVERSE ROTATION PREVENTING APPARATUS FOR A SPINNING REEL

BACKGROUND OF THE INVENTION

1. Field of the Invention

The present invention relates to a reverse rotation preventing apparatus for a spinning reel, more particularly to an apparatus for allowing a handle of a spinning reel to be rotated in a forward direction to wind a fishing line but for preventing the handle from being rotated in a backward direction to unwind the fishing line, which has a plurality of rollers, these rollers being inserted into an inner periphery surface of an outer race and thereafter being fitted between the inclined surfaces and an outer periphery surface of a sleeve during the rotation of the handle in the backward direction, the rollers being stuck to a magnetic material of a plurality of roller supporters, the rollers being spaced from a nonmagnetic material of the roller supporters, which is capable of minimizing a rotational resistance of the handle.

2. Description of the Related Art

Generally, a reverse rotation preventing apparatus for a fishing reel is installed on a main shaft between a reel main body and a rotor. This rotation preventing apparatus allows a handle of the fishing reel to be rotated in the forward direction or backward direction due to the operation of a certain control lever.

When an angler wants to control the length of a fishing line in order to put a bait on a hook of a fishing reel or to throw a fishing rod, the reverse rotation preventing apparatus allows a handle of the fishing reel to be rotated in the forward direction to wind a fishing line and to be rotated in the backward direction to unwind the fishing line.

After dropping the fishing line in the water, the handle can be only rotated in the forward direction to wind the fishing line due to the operation of the reverse rotation preventing apparatus. At this time, if a proper tension is applied to the fishing line, the angler exactly feels a bite. Although the angler pulls the fishing line with a jerk, the fishing line is not released from a spool of the fishing reel.

FIG. 1 is an exploded perspective view of a reverse rotation preventing apparatus in a conventional spinning reel, and FIG. 2 is a transverse sectional view of the conventional reverse rotation preventing apparatus;

Referring to FIGS. 1 and 2, a reverse rotation preventing apparatus for a fishing reel is consisted of an inner race body (5) and a reverse preventing member (6). The inner race body (5) includes an inner race (5a) having a cylindrical shape. A plurality of roller receiving portions (5b) are formed in a radial periphery of the inner race (5a) at a uniform distance interval. A needle roller (5d) is received in the roller receiving portion (5b) and thereafter it is supported by an elastic supporter (5c), respectively. The reverse preventing member (6) includes a cylindrical body for receiving the inner race body (5) therein. A plurality of depressed portions (6e) and a plurality of inclined surfaces (6f) are successively formed at a radial inner surface of the reverse preventing member (6). The reverse preventing member (6) includes a plurality of protrusions (6c) which protrude from a radial outer periphery of the reverse preventing member (6). At this time, a locking groove (6b) is formed between the protrusions (6c).

FIGS. 3a and 3b are fragmentary transverse sectional views of the conventional reverse rotation preventing apparatus, showing the operational state of the reverse preventing apparatus.

Hereinbelow, the operation of the reverse preventing member as described above will be described in detail with reference to FIGS. 3a and 3b.

If an angler rotates a handle (not shown) of the fishing reel in the forward direction or the backward direction under the state that a locking member (12) does not locked in the locking groove (6b) of the reverse preventing member (6), then a sleeve (11) inserted into a main shaft (10) begins to be rotated in the clockwise direction or the counter-clockwise direction in the drawings.

When the sleeve (11) is rotated in the clockwise direction, the inner race (5) is rotated in the clockwise direction together with the sleeve (11) and thereby the needle roller (5d) of the inner race (5) is locked in the depressed portion (6e) of the reverse preventing member (6). When the sleeve (11) is rotated in the counter-clockwise direction, the inner race (5) is rotated in the counter-clockwise direction together with the sleeve (11). Thereby, the needle roller (5d) of the inner race (5) is wedged between the outer periphery of the sleeve (11) and the inclined surface (6f) of the reverse preventing member (6).

Under this state, if the locking member (12) is locked in the locking groove (6b) of the reverse preventing member (6) as shown in FIG. 3a (e.g., the reverse preventing member (6) is set to the ON-state), then the sleeve (11) is rotated in the clockwise direction during the rotation of the handle in the forward rotational direction. Further, the inner race (5) is rotated in the clockwise direction together with the sleeve (11) and the needle roller (5d) of the inner race (5) is locked in the locking groove (6b) of the reverse preventing member (6). Since the locking member (12) is locked in the locking groove (6b), the reverse preventing member (6) can not be rotated. However, the needle roller (5d) is comfortably supported by the elastic supporter (5c) within the depressed portion (6e) of the reverse preventing member (6) When the sleeve (11) is rotated in the clockwise direction, the needle roller (5d) is pushed toward a remaining space of the depressed portion (6e), respectively. As a result, the handle can be rotated in the forward rotational direction.

If the handle is rotated in the backward direction under the state that the reverse preventing member (6) is set to the ON-state, then the inner race (5) is rotated in the counter-clockwise direction together with the sleeve (11). Thereby, the needle roller (5d) of the inner race (5) is wedged between the outer periphery surface of the sleeve (11) and the inclined surface (6f) of the reverse preventing member (6). Under this case, it is impossible to rotate the reverse preventing member (6). Further, it is impossible to obtain a rotational space for the sleeve. As a result, the handle can not be rotated in the backward direction.

However, the needle roller (5d) is supported by the elastic supporter (5c) such as a plate spring. Accordingly, if an elasticity of the elastic supporter (5c) deteriorates, then the elastic supporter (5c) can not smoothly push the needle roller (5d) toward a position of between the outer periphery of the sleeve (11) and the inclined surface (6f) of the reverse preventing member (6). Further, the needle roller (5d) is rotated on its axis due to the rotation of the sleeve (11) before the needle roller (5d) being wedged between the outer periphery of the sleeve (11) and the inclined surface (6f) of the reverse preventing member (6). As a result, the handle can be rotated in the backward under the state that the reverse preventing member (6) is operating at the ON-state.

If the needle roller (5d) is positioned in the depressed portion (6e) of the reverse preventing member (6), then the needle roller (5d) is released from the needle roller receiving portion (5b) toward the depressed portion (6e). As a result, the handle of the conventional fishing reel cannot be smoothly operated.

Since the operation of the reverse preventing member (6) is mainly dependent to the elastic force of the elastic supporter (5c), the expected life span of the reverse preventing member (6) becomes short such as that of the life cycle of the elastic supporter (5c). If the elastic supporter (5c) does not exactly combined to the inner race (5) or the needle roller (5d) does not fixed at an exact position in the needle roller receiving portion (5b) by the elastic supporter (5c), then the reverse preventing member (6) frequently gets out of order. Further, inferior goods are produced in large quantities during the manufacturing process of the reverse preventing member.

When the handle is rotated in the backward direction and the forward direction under the state that the reverse preventing member (6) is set to the OFF-state, the inner race (5) and the reverse preventing member (6) are rotated together with the sleeve (11). At this time, the rotational resistance is generated during the rotation of the handle. Since the protrusions (6c) of the reverse preventing member (6) have a large width of gear-tooth shape, the locking member (12) is not directly locked into the locking groove (6b) of the reverse preventing member (6). Accordingly, the locking member (12) is mainly laid on the protrusions (6c). Under this case, a certain rotational gap for allowing the spinning reel to be rotated in the backward rotational direction can be created until the reverse preventing member (6) substantially operates.

If this rotational gap is created, then it is hard to uniformly control the tension of the fishing line. As a result, it is hard to exactly sense the fact that a fish takes a bite. Accordingly, after setting the reverse preventing member (6) to the ON-state, the angler must rotate the handle little by little in order to exactly lock the locking member (12) in the locking groove (6c) of the reverse preventing member (6).

SUMMARY OF THE INVENTION

The present invention is contrived to solve the foregoing problems. It is an object of the present invention to provide a reverse rotation preventing apparatus for a spinning reel, which is capable of allowing a handle of a spinning reel to be rotated in a forward direction to wind a fishing line but for effectively preventing the handle from being rotated in a backward direction to unwind the fishing line, and is capable of minimizing a rotational resistance of the handle.

In order to achieve the above object, the present invention provides a reverse rotation preventing apparatus for a fishing reel, the reverse rotation preventing apparatus including a housing which has a locking protrusion inwardly protruding from a radial inner surface of a housing body, the housing body having an open lower portion, a holder receiving portion which is provided at a radial inner side of the housing body, a lever through hole which is formed at a radial one side outer surface of the housing body, a lever arm which outwardly protrudes from the outer surface of the housing body, a plurality of locking portions which outwardly protrude from the radial outer surface of the housing body, and an axle supporting portion which protrudes from an upper surface of the housing body at a radial outer periphery of the holder receiving portion; an outer race having an annular body adapted to fitted into the locking protrusion of the housing, a plurality of depressed portions and a plurality of inclined surfaces which are continuously formed at an inner periphery surface of the outer race; a plurality of rollers which are inserted into the inner periphery surface of the outer race and are fitted between the inclined surfaces and an outer periphery surface of a sleeve; a lower cover being inserted into the open lower portion of the housing body of the housing and being engaged with the lower portion of the housing body; and a roller holder having a plurality of roller supporters which are formed on an upper surface of the roller holder, the roller holder having an axle insertion hole which is formed through the center portion of a holder body, the roller supporters which are spaced from one another at a predetermined distance and are disposed around the axle insertion hole, the reverse rotation preventing apparatus improvement comprising; the roller supporters include a magnetic material and a nonmagnetic material, the magnetic material facing in the backward rotational direction of the fishing reel, the nonmagnetic material facing in the forward rotational direction of the fishing reel, the rollers are brought into contact with the inner periphery surface of the outer race and the outer periphery surface of the sleeve under the state that the rollers are inserted between the roller supporters, the rollers are stuck to the magnetic material and whereby the rollers are spaced from the nonmagnetic material at a predetermined distance.

As described above, in the reverse rotation preventing apparatus according to the present invention, the roller is supported by the magnetic material of the roller supporters. This roller is fitted into the inclined surface of the outer race during the rotation of the handle in the backward rotational direction. The roller is spaced from the nonmagnetic material of the roller supporters at a predetermined distance.

BRIEF DESCRIPTION OF THE DRAWINGS

The above object and other characteristics and advantages of the present invention will become more apparent by describing in detail a preferred embodiment thereof with reference to the attached drawings, in which:

FIG. 1 is an exploded perspective view of a reverse rotation preventing apparatus in a conventional spinning reel;

FIG. 2 is a transverse sectional view of the conventional reverse rotation preventing apparatus;

FIGS. 3a and 3b are fragmentary transverse sectional views of the conventional reverse rotation preventing apparatus, showing the operational state of the reverse preventing apparatus;

FIG. 4 is an exploded perspective view of a reverse rotation preventing apparatus in a spinning reel according to a preferred embodiment of the present invention;

FIG. 5 is a plan view of a roller holder which is employed in the reverse rotation preventing apparatus of the spinning reel according to the preferred embodiment of the present invention; and FIGS. 6a and 6b are transverse sectional views of the reverse rotation preventing apparatus of the spinning reel according to the preferred embodiment of the present invention, showing the operational state of the reverse preventing apparatus.

DETAILED DESCRIPTION OF THE INVENTION

Hereinafter, a preferred embodiment of the present invention will be explained in more detail with reference to the accompanying drawings.

Referring to FIG. 4, a reverse rotation preventing apparatus in a spinning reel according to a preferred embodiment of the present invention includes a housing (20) which functions as a case, a lower over (60) which is inserted into a open lower portion of the housing (20), an outer race (30) which is engaged with an inner periphery surface of the housing (20), and a roller holder (50) having a plurality of roller supporters (51) which upwardly protrude from an upper surface of the roller holder (50).

The housing (20) has a locking protrusion (23) radially inwardly protruding from a radial inner surface of a housing body, and a holder receiving portion (24) which is provided at a radial inner side of the housing body. A lever through hole (26) is formed at a radial one side outer surface of the housing body. Further, a lever arm (22) outwardly protrudes from the radial outer surface of the housing body at a position adjacent to the lever through hole (26).

A control lever (52) outwardly protruding from a radial outer surface of the roller holder (50) can be inserted into the lever through hole (26). When the control lever (52) is inserted into the lever through hole (26), it can freely rotate within the lever receiving hole (26) at a predetermined rotating angle.

Further, a plurality of combining portions (21) outwardly protrudes from the outer periphery surface of the housing body. A combining hole (21) is formed through the combining portion (21), respectively. The housing (20) includes an axle supporting portion (25) which protrudes from the upper surface of the housing body at a radial outer periphery of the holder receiving portion (24).

The outer race (30) has an annular body adapted to fit into the locking protrusion (23) of the housing (20). At this time, a plurality of depressed portions (31) and a plurality of inclined inner surfaces (32) are continuously formed at an inner periphery surface of the outer race (30). Further, locking surfaces (33) are formed at an outer periphery surface of the outer race (30).

The roller holder (50) has a ring-shaped body of which an axle insertion hole (50a) formed through the center portion of the body. A sleeve (11) and a main axle (10) are inserted into the axle insertion hole (50a). The roller supporters (51) are formed on the upper surface of the roller holder (50). On the upper surface of the roller holder (50), the roller supporters (51) are spaced from one another at a predetermined distance and are disposed around the axle insertion hole (50a). These roller supporters (51) can be inserted into the inner periphery of the outer race (30). As described above, the control lever (52) outwardly protrudes from the radial outer surface of the roller holder (50). The control lever (52) is adapted to be inserted into the lever through hole(26)

As shown in FIG. 5, the roller supporters (51) of the roller holder (50) are constituted of a magnetic material (51a) and a nonmagnetic material (5b), respectively. At this time, the magnetic material (51a) faces in the backward rotational direction. Alternatively, the nonmagnetic material (51b) faces in the forward rotational direction. Consequently, the magnetic material (51a) and the nonmagnetic material (61b) sit face to face with each other.

The rollers (40) are brought into contact with the inner periphery surface of the outer race (30) and the outer periphery surface of the sleeve (11) under the state that they are inserted between the roller supporters (51). These rollers (40) are stuck to the magnetic material (51a). Accordingly, the rollers (40) are spaced from the nonmagnetic material (51b) at a predetermined distance. Both side surfaces of the roller supporters (51) are curved at an arch so that the rollers (40) can be easily inserted between the roller supporters (51).

Referring to FIG. 4, the lower cover (60) has a ring-shaped body which can be inserted into the open lower portion of the housing (20). After the insertion of the lower cover (60), this lower cover (60) is integrally engaged with the housing (20). The lower cover (60) has an axle insertion hole (60a) formed through the ring-shaped body thereof. The sleeve (11) and the main axle (10) can be inserted into the axle insertion hole (60a).

Hereinbelow, the assembling process and the operation of the reverse rotation preventing apparatus as described above will be briefly described with reference to FIGS. 4 to 6b.

At first, the outer race (30) is inserted into the open lower portion of the housing (20) in a state that the locking surfaces (33) are inserted into the locking protrusion (23). Thereafter, the roller (40) is inserted between the roller supporters (51) of the roller holder (50). At this time, the roller (40) is supported by a magnetic force generated from the magnetic material (51a). Next, the roller holder (50) is positioned in the holder receiving portion (24) of the housing (20) in a state that the roller (40) and the roller supporters (51) are inserted into the inner periphery surface of the outer race (30). At this time, the control lever (52) of the roller holder (50) protrudes through the lever through hole (26) of the housing (20). Thereafter, the lower cover (50) is engaged with the lower portion of the housing (20).

As shown in FIGS. 6a and 6b, the reverse rotation preventing apparatus according to the present invention is inserted into the front surface of the reel main body in a state that the sleeve (11) is fitted onto the main axle (10). Under this state, a plurality of screws are inserted through the combining hole (21a) of the combining portion (21) formed at the housing (20). Thereafter, the control lever (52) is set to be rotated at a predetermined rotating angle due to the switching operation of a reverse rotation lever (not shown) with the aid of a spring (70). At this time, the spring (70) is disposed between the control lever (52) of the roller holder (50) and the lever arm (22) of the housing (20). Consequently, the installation of the reverse rotation preventing apparatus according to the present invention is completed.

In the reverse rotation preventing apparatus according to the present invention as described above, when the control lever (52) is pushed toward the right side of the FIG. 6 due to the pressing force applied by a pressing member (80) as shown in FIG. 6a (e.g., the control lever (52) is set to the OFF-state), the roller (40) supported between the roller supporters (51) by the magnetic force is positioned in the depressed portion (31) of the outer race (30). In this case, the roller (40) is brought into contact with a radial outer surface of the sleeve (11) between the outer periphery surface of the sleeve (11) and the depressed portion (31) of the outer race (30). At this time, the sufficient space adapted to receive the roller (40) is created between the outer periphery surface of the sleeve (11) and the depressed portion (31) of the outer race (30).

Under the OFF-state as described, if a handle (not shown) of the spinning reel is rotated in the forward direction or the backward direction, then the sleeve (11) is rotated in the clockwise direction or the counter-clockwise direction. At this time, the housing (20) is fixed to the front surface of the reel main body and the outer race (30) is fitted into the locking protrusion (23). Further, the roller holder (50) is fixed by the pressing member (80). Accordingly, the sleeve (11) is only rotated in accordance with the rotation of the handle. As a result, the roller (40) is easily biased toward the space adjacent to the depressed portion (31) of the router race (30) in accordance with the rotation of the sleeve (11). Therefore, the rotation of the sleeve (11) is not hindered by the roller (40) and thereby the handle of the spinning reel can be rotated in the clockwise direction and the counter-clockwise direction.

If the control lever (52) of the roller holder (50) is rotated in the counter-clockwise direction due to the elastic force of the spring (70), the roller holder (50) is also rotated in the counter-clockwise direction. Since the control lever (52) is integrally formed with the roller holder (50), the roller holder (50) is rotated in the counter-clockwise direction. As a result, the roller supporters (51) of the roller holder (50) and the roller (40) supported between the roller supporters (51) are rotated in the counter-clockwise direction together with the roller holder (50). Consequently, the roller (40) is positioned on the inclined surface (32) of the outer race (30) as shown in FIG. 6b (e.g., the control lever (52) is set to the ON-state).

Under the ON-state as described, if a handle (not shown) of the spinning reel is rotated in the forward direction, then the sleeve (11) is rotated in the clockwise direction in accordance with the rotation of the handle. At this time, the housing (20) is fixed to the front surface of the reel main body and the outer race (30) is fitted into the locking protrusion (23) of the housing (20). Further, the roller holder (50) is fixed due to the elastic force applied from the spring (70) Accordingly, the sleeve (11) is only rotated in the clockwise direction due to the rotation of the handle.

When the sleeve (11) is rotated in the clockwise direction at a predetermined rotational angle, the roller (40) contacting with the outer surface of the sleeve (11) is pushed toward the depressed portion (32) at the inclined surface (31) of the outer race (30) Since the roller (40) is spaced from the nonmagnetic material (51b) of the roller supporters (51) and is supported at the magnetic material (51a), the roller can be easily pushed toward the depressed portion (31) at the inclined surface (32) of the outer race (30). As a result, the sufficient space adapted to allow the sleeve (11) for being rotated is created and thereby the sleeve (11) can be rotated in the clockwise direction. Accordingly, the handle can be rotated in the forward direction.

Under the ON-state as described, if a handle (not shown) of the spinning reel is rotated in the backward direction, then the sleeve (11) is rotated in the counter-clockwise direction in accordance with the rotation of the handle. In this case, the roller (40) is dragged toward the magnetic material (51a) due to the magnetic force generated from the magnetic material (51a). Then, the roller (40) is inserted between the outer periphery surface of the sleeve (11) and the inclined surface (32) of the outer race (30). As a result, the sufficient space adapted to allow the sleeve (11) for being rotated is not created and thereby the sleeve (11) can not be rotated in the counter-clockwise direction. Consequently, the handle can not be rotated in the backward direction.

As described above, the roller supporters (51) of the roller holder (50) are constituted of the magnetic material (51a) and the nonmagnetic material (51b), respectively. The magnetic material (51a) faces in the backward rotational direction. Alternatively, the nonmagnetic material (51b) faces in the forward rotational direction. As a result, the magnetic material (51a) and the nonmagnetic material (61b) sit face to face with each other. The roller (40) functions as a switch to allow the reverse rotation preventing apparatus according to the present invention for being operated under the ON-state or the OFF-state. If a handle (not shown) is rotated in the forward rotational direction in a state that the reverse rotation preventing apparatus is set to the ON-state, then the roller (40) is easily pushed toward the gap of between the nonmagnetic material (51b) and the roller (40) due to the rotation of the sleeve (11). Consequently, the resistance generated during the rotation of the handle is minimized.

If the handle (not shown) is rotated in the backward rotational direction, the rotational direction of the handle is changed and the roller (40) rapidly returns at a position adjacent to the magnetic material (51a) due to the magnetic force generated from the magnetic material (51a). As a result, the roller (40) is inserted between the outer periphery surface of the sleeve (11) and the inclined surface (32) of the outer race (30). Consequently, it is possible to prevent the handle from being rotated in the backward direction.

Accordingly, any rotational gap for allowing the spinning reel to be rotated in the backward rotational direction is not created. Accordingly, it is possible to maintain the tension of the fishing line at a fixed value. Further, it is not necessary to frequently manipulate the handle in order to operate the reverse rotation preventing apparatus after setting the reverse rotation preventing apparatus to the ON-state.

If the handle is rotated in the clockwise direction or the counter-clockwise direction in a state that the reverse rotation preventing apparatus is set to the OFF-state, then the-roller (40) is easily pushed toward the depressed portion (31) of the outer race (30) through the gap formed between the nonmagnetic material (51b) and the roller (40) due to the rotation of the sleeve (11). Consequently, the resistance generated during the rotation of the handle is minimized.

If the handle (not shown) is not rotated, then the roller (40) rapidly returns at a position adjacent to the magnetic material (51a) due to the magnetic force generated from the magnetic material (51a). As a result, the roller (40) is always supported at a predetermined position. Accordingly, a break down of the reverse rotation preventing apparatus according to the present invention is not generated.

Since the roller (40) is supported by the magnetic force generated from the magnetic material (51a), the expected life span of the reverse rotation preventing apparatus according to the present invention is semi-permanent. Further, since the roller (40) is always fixed at a predetermined position between the roller supporters (51), the position of the roller (40) is not changed during the assembling process of the reverse rotation preventing apparatus according to the present invention.

As described above, in the reverse rotation preventing apparatus according to the present invention, the roller is supported by the magnetic material of the roller supporters. This roller is fitted into the inclined surface of the outer race during the rotation of the handle in the backward rotational direction. The roller is spaced from the nonmagnetic material of the roller supporters at a predetermined distance. Due to this construction, it is possible to minimize the resistance generated at the time that the handle is rotated in the forward direction during the setting of the reverse rotation preventing apparatus to the ON-state. Further, when the handle is rotated in the backward direction, the roller rapidly returns the position of between the outer race and the sleeve due to the magnetic force at the point of time of the handle's rotational direction being changed.

When the handle is rotated in the backward direction or the forward direction under the OFF-state of the reverse rotation preventing apparatus, the rotational resistance is minimized.

If the handle (not shown) is not rotated, then the roller rapidly returns at a position adjacent to the magnetic material due to the magnetic force generated from the magnetic material. As a result, the roller is always supported at a predetermined position. Accordingly, a break down of the reverse rotation preventing apparatus according to the present invention is not generated. Further, the expected life span of the reverse rotation preventing apparatus is highly prolonged.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A reverse rotation preventing apparatus for a fishing reel, the reverse rotation preventing apparatus including a housing (20) which has a locking protrusion (23) inwardly protruding from a radial inner surface of a housing body, the housing body having an open lower portion, a holder receiving portion (24) which is provided at a radial inner side of the housing body, a lever through hole (26) which is formed at a radial one side outer surface of the housing body, a lever arm (22) which outwardly protrudes from the outer surface of the housing body, a plurality of locking portions (21) which outwardly protrude from the radial outer surface of the housing body, and an axle supporting portion (25) which protrudes from an upper surface of the housing body at a radial outer periphery of the holder receiving portion (24); an outer race (30) having an annular body adapted to fitted into the locking protrusion (23) of the housing (20), a plurality of depressed portions (31) and a plurality of inclined surfaces (32) which are continuously formed at an inner periphery surface of the outer race (30); a plurality of rollers (40) which are inserted into the inner periphery surface of the outer race (30) and are fitted between the inclined surfaces (32) and an outer periphery surface of a sleeve (11); a lower cover (60) being inserted into the open lower portion of the housing body of the housing (20) and being engaged with the lower portion of the housing body; and a roller holder (50) having a plurality of roller supporters (51) which are formed on an upper surface of the roller holder (50), the roller holder (50) having an axle insertion hole (50a) which is formed through the center portion of a holder body, the roller supporters (51) which are spaced from one another at a predetermined distance and are disposed around the axle insertion hole (50a), the reverse rotation preventing apparatus improvement comprising; the roller supporters (51) include a magnetic material (51a) and a nonmagnetic material (51b), the magnetic material (51a) facing in the backward rotational direction of the fishing reel, the nonmagnetic material (51b) facing in the forward rotational direction of the fishing reel, the rollers (40) are brought into contact with the inner periphery surface of the outer race (30) and the outer periphery surface of the sleeve (11) under the state that the rollers (40) are inserted between the roller supporters (51), the rollers (40) are stuck to the magnetic material (51a) and whereby the rollers (40) are spaced from the nonmagnetic material (51b) at a predetermined distance.

* * * * *